April 4, 1961

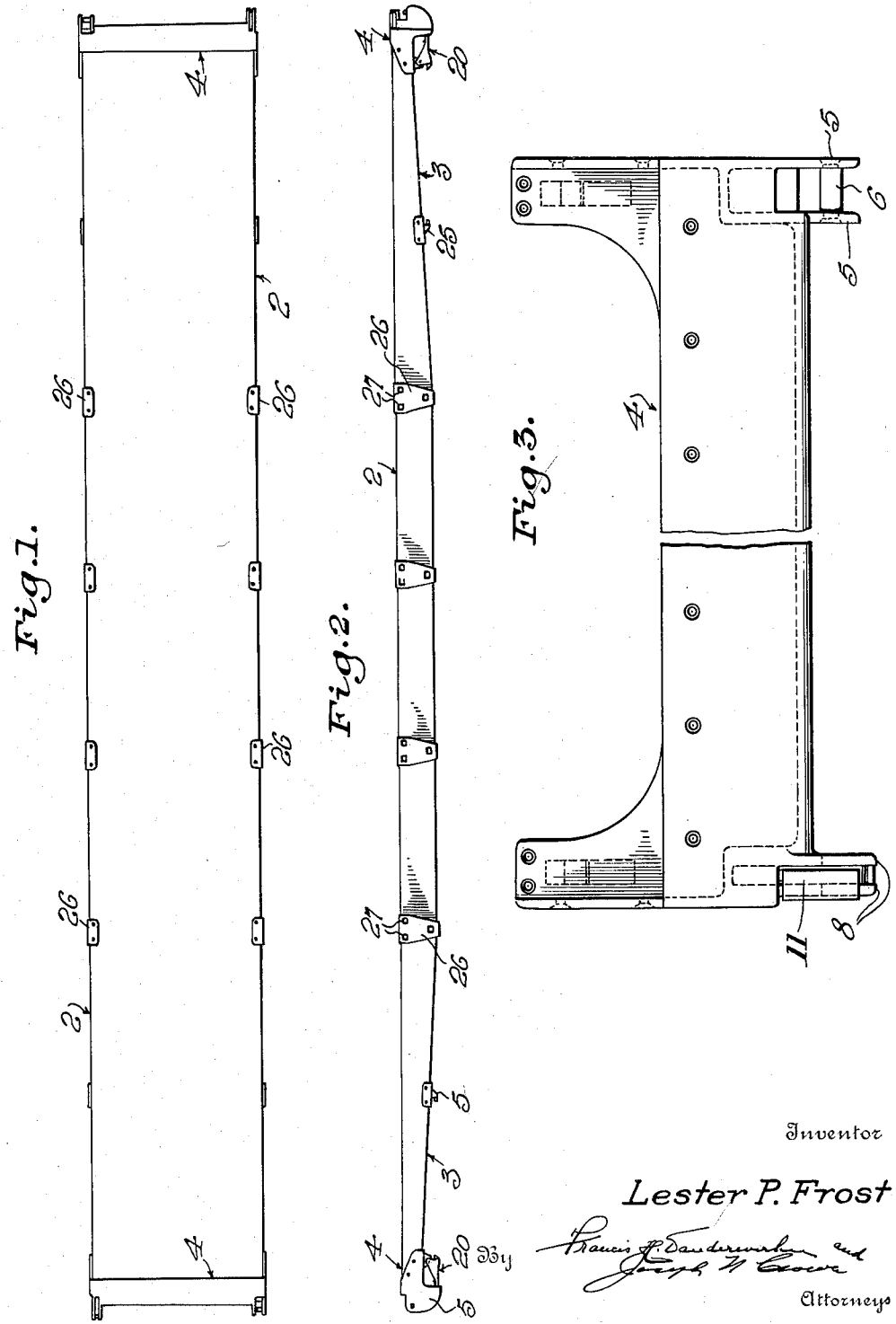

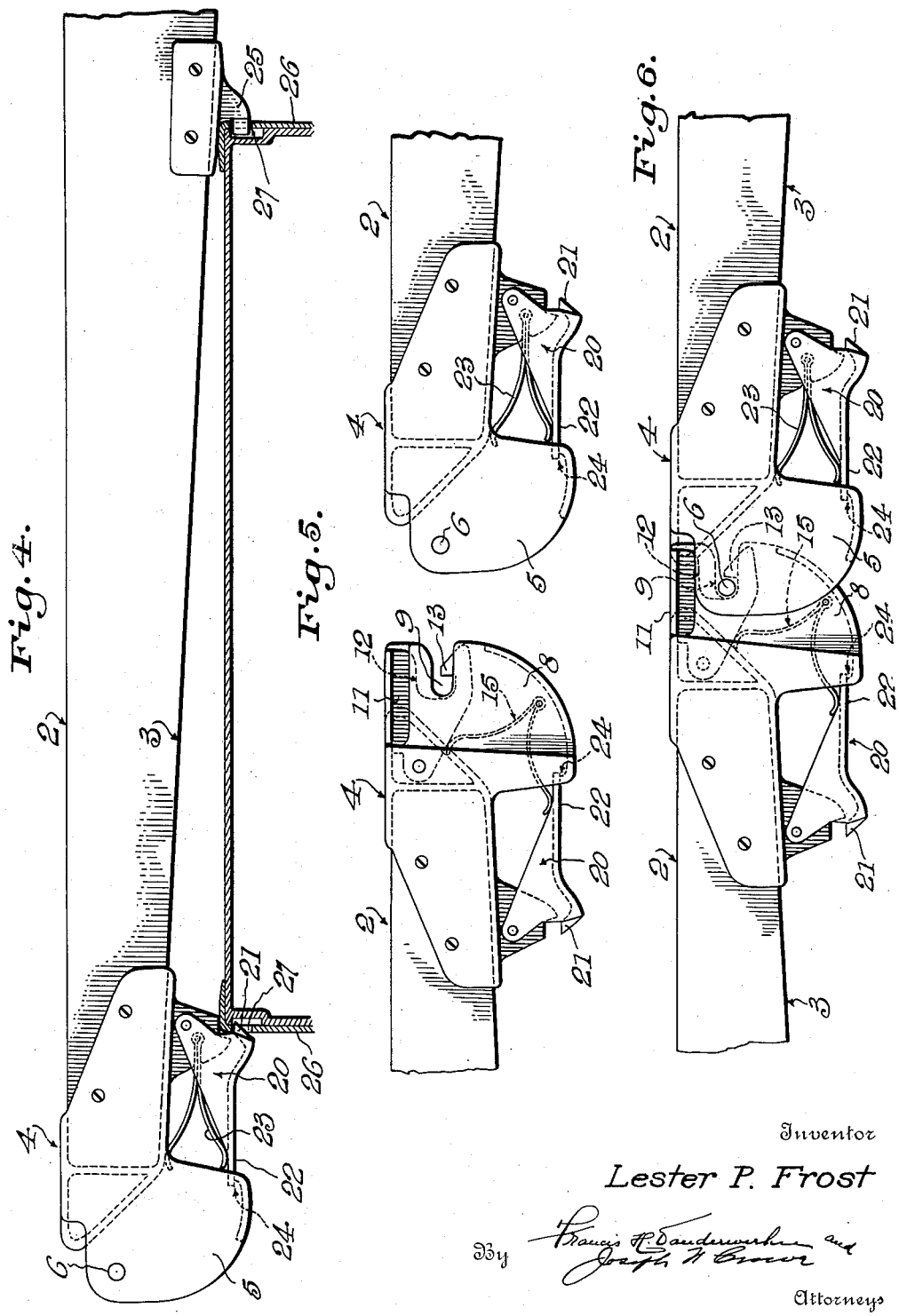

L. P. FROST 2,977,612

PORTABLE FLOATING BRIDGE

Filed June 12, 1945

Inventor

Lester P. Frost

By

Attorney

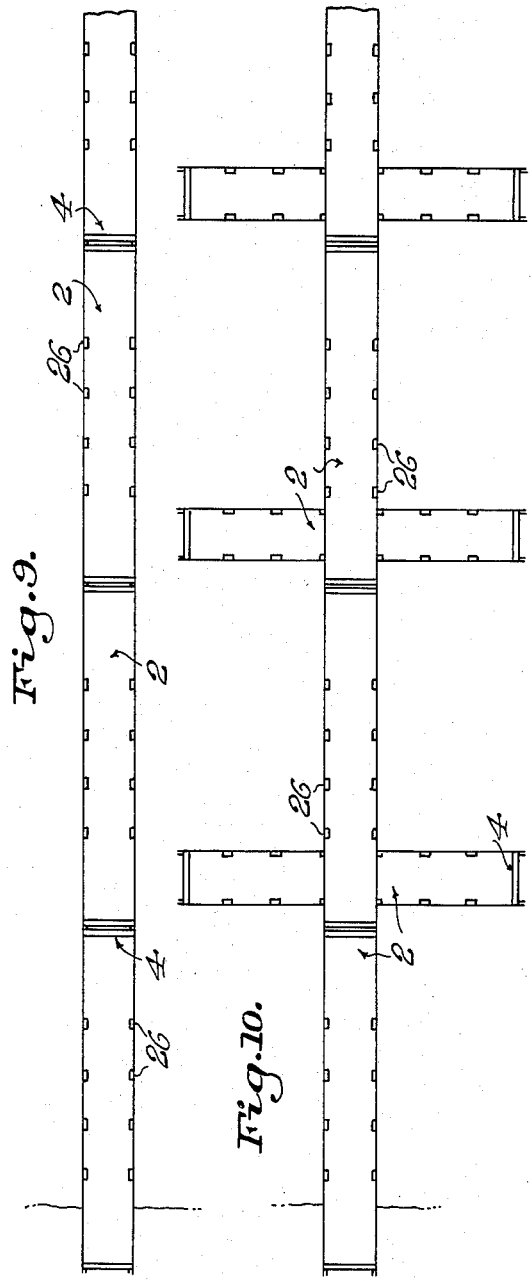
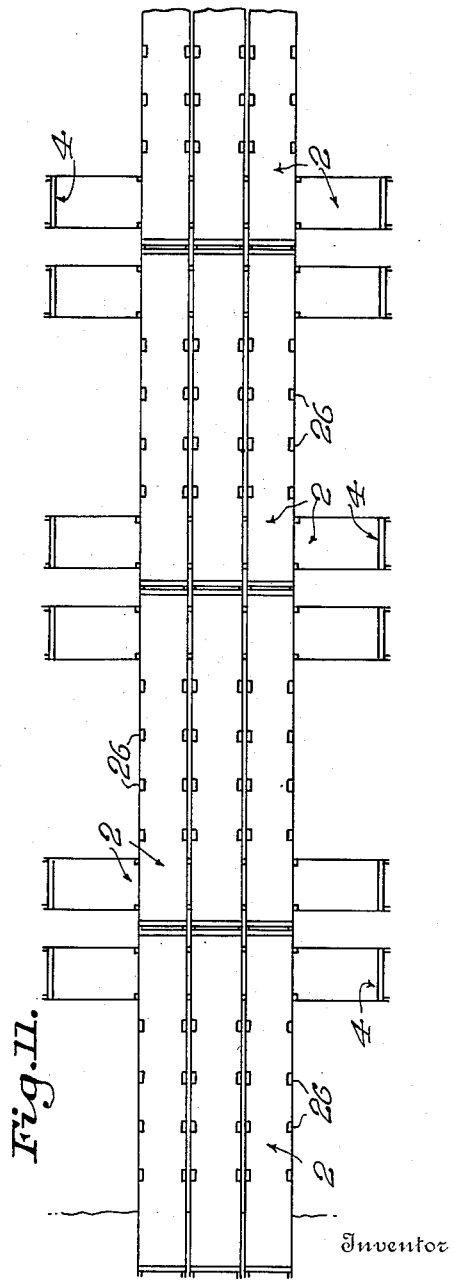

April 4, 1961
L. P. FROST
2,977,612
PORTABLE FLOATING BRIDGE
Filed June 12, 1945
5 Sheets-Sheet 5
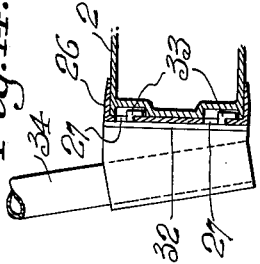
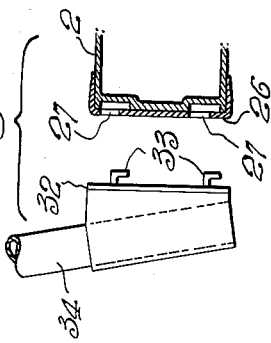
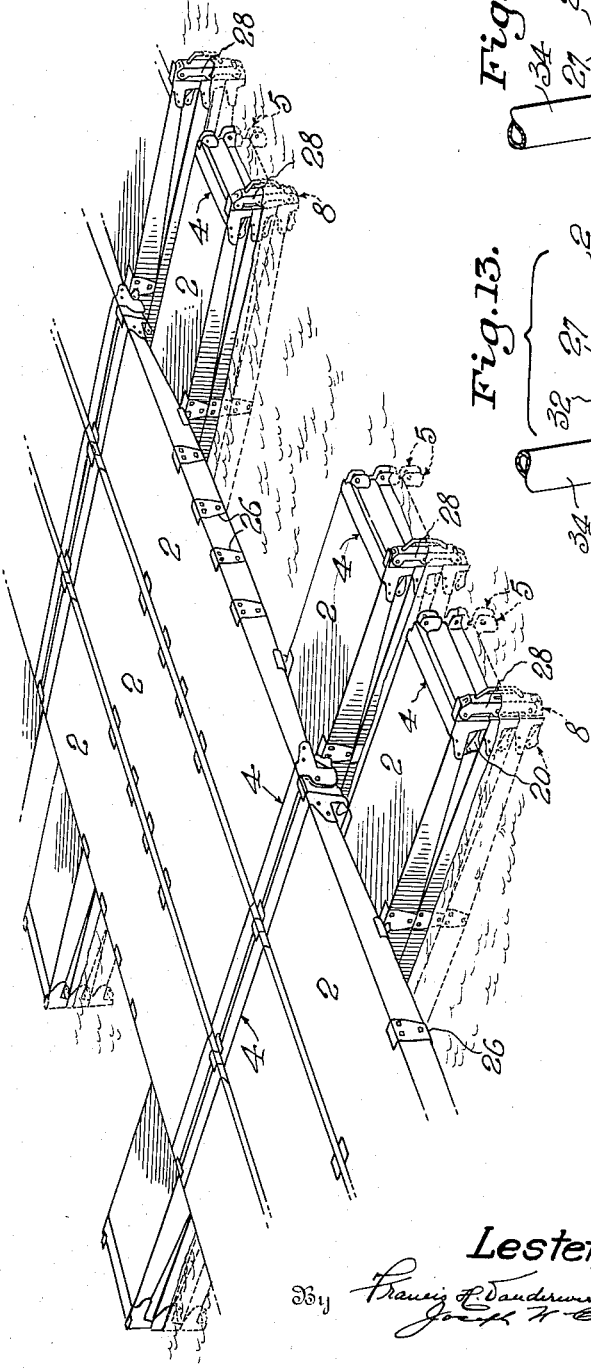
Inventor
Lester P. Frost
Attorneys – # United States Patent Office 2,977,612
Patented Apr. 4, 1961

2,977,612

PORTABLE FLOATING BRIDGE

Lester P. Frost, United States Army, Fort Belvoir, Va.
(P.O. Box 409, Placerville, Calif.)

Filed June 12, 1945, Ser. No. 599,041

7 Claims. (Cl. 14—27)

(Granted under Title 35, U.S. Code (1952), sec. 266)

The invention described herein may be manufactured and used by or for the Government for governmental purposes, without payment to me of any royalty thereon.

This invention relates to bridges, and more particularly to one which is adapted to float on a body of water; and is so constructed as to permit of easy and rapid erection and dismantling, thereby suiting a variety of needs, including those of the military.

Numerous types of portable floating bridges have heretofore been proposed but, so far as I am aware, all of them are possessed of certain inherent disadvantages. The prime consideration is, of course, to provide a serviceable bridge of the type described which may be easily and rapidly erected, dismantled and transported; and one which is at the same time comparatively inexpensive to manufacture and maintain. Such bridges are sometimes known as "footbridges" and are fundamentally of two distinct classes: i.e. the "buoyant-mattress" type, and the "float-and-duckboard" type.

In order to form a portable footbridge floating bridge of the buoyant-mattress type it is unfolded to form a fully continuous member, and is objectionable for the reason that the mattress is not only very unstable, even in still water, but also for the reason that it forms a continuous dam across the stream and does not allow the passage of debris. The float-and-duckboard type of footbridge is constructed by arranging the necessary number of duckboards in end-abutting relationship and attaching thereto, at suitable intervals, right-angularly disposed floats upon which the duckboards rest. In this manner there is obtained additional buoyancy. Heretofore, these duckboards have differed in design from the floats used to support them; and the construction of the portable floating bridge has depended on the supply of these different elements in appropriately different quantities at the site.

It is among the objects of the present invention to provide a portable floating bridge which is composed of a plurality of buoyant elements capable of serving as either duckboards or floats whereby there is eliminated the difficulties and confusion inherent in the float-and-duckboard type of footbridge of the prior art. This is particularly important in military use wherein the elements are exposed to destruction by gunfire, etc. and replacement may be extremely difficult or impossible.

Another object is the provision of a portable floating bridge of the class described in which the buoyant elements thereof may be erected or dismantled with great ease and speed, these being functions of novel fastening instrumentalities which will be described more fully hereinafter.

Still another object is to provide a portable floating bridge comprised of elongate interchangeable buoyant elements which serve either as duckboards or as floats, in which the tops of the said elements are substantially flat, and the bottoms substantially parallel at the midsection but tapering therefrom toward the ends to provide a "rake," which reduces resistance and increases stability in high currents.

Another object of the previously-described raking of the ends of the bottoms of the buoyant elements of the portable floating bridge is to permit the disposition of the attached fastening instrumentalities to lie within the space provided by the overall depth of the said elements, thereby facilitating stacking, transportation, etc.

Another object is the provision of a portable floating bridge whose component buoyant elements are, when assembled in sufficient numbers, capable of supporting very heavy loads, such as motor vehicles.

The invention, then, comprises the features hereinafter fully described, and as particularly pointed out in the claims, the following description and the annexed drawings setting forth in detail certain illustrative embodiments of the invention, these being indicative of but several of many ways in which the principles of the invention may be successfully employed.

In the drawings:

Figure 1 is a plan of one of the buoyant elements of the bridge, the same being adapted to serve as either a duckboard or as a float, as before stated;

Figure 2 is a side elevation of the showing of Figure 1;

Figure 3 is an enlarged plan of a casting member which carries certain fastening instrumentalities which will be later described, one of these castings being secured to each end of each of the elongate buoyant members;

Figure 4 is an enlarged fragmentary side elevation of one end of one of the buoyant elements as disposed to serve as a duckboard, while positioned in right-angular relationship and beneath it is a similar element which is fastened thereto and adapted to serve as a float, the latter being fragmentarily shown in section;

Figure 5 is a fragmentary side elevation of two aligned buoyant elements immediately prior to assembly into end-abutting and fastened relationship to thereby serve as connected duckboards;

Figure 6 is a view similar to that of Figure 5, but showing the fastening instrumentalities in cooperating relationship;

Figure 9 is a plan illustrating the manner in which a plurality of buoyant elements may be assembled together and fastened in end-abutting relationship to serve as connected duckboards and form a simple foot bridge;

Figure 10 is a view similar to that of Figure 9, but illustrating in combination a single right-angularly disposed buoyant element disposed beneath each of the duckboards to serve as a float therefor;

Figure 11 is a plan illustrating the assembly of three parallel lines of transversely aligned duckboards to form a bridge of increased width, with a single buoyant element disposed at each end of each transverse group of duckboards to serve as floats therefor;

Figure 12 is a perspective of the showing of Figure 11, but illustrating the employment of a plurality of superposed buoyant elements (in the manner of Figures 7 and 8) to serve as unitary floats of increased buoyancy;

Figure 8:
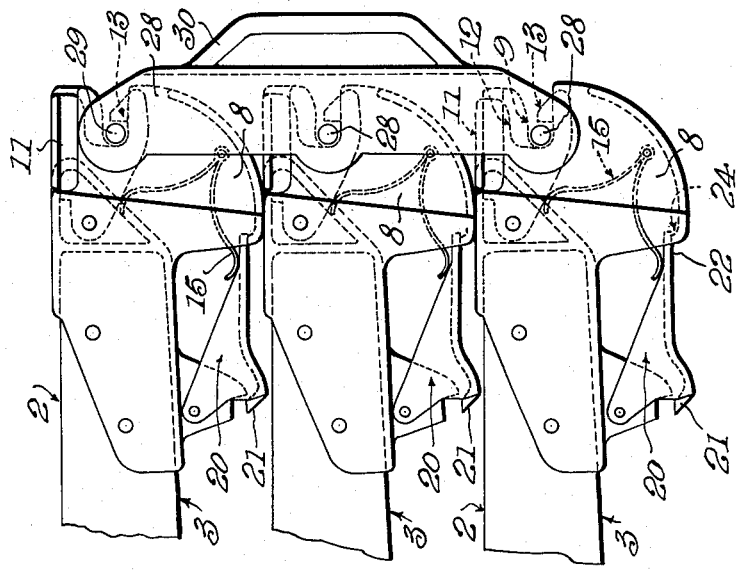
Figure 8 is a side elevation of the showing of Figure 7.

Figure 13 is a composite view illustrating fragmentarily, and in side elevation, the lower end of a standard which forms part of a detached handrail for the portable floating bridge. together with a cooperating attaching instrumentality which is carried in suitable numbers at appropriate intervals along the sides of the buoyant elements, the said attaching instrumentality being illustrated in section; and Figure 14 is a view similar to that of Figure 13 but showing the elements thereof in connected relationship.

Referring more particularly to the drawings, the numeral 2 indicates the buoyant members per se, each of the same comprising an elongate substantially flat member of shallow depth. They may be either naturally buoyant, as when formed of solid balsa wood for example, or rendered buoyant by utilizing hollow compartments which may be watertight, or filled with buoyant material. In any event, these buoyant members 2 are adapted for assembly in a certain prescribed manner, as will appear hereinafter, and form the duckboards and floats of the portable floating bridge of the invention. As before stated, this bridge may take the form of a simple and lightweight unit for the movement thereover of persons afoot, or it may take the form of a materially larger and stronger structure for supporting such loads as light trucks, etc.

As shown most clearly in Figure 2, the upper surface of each of these buoyant members 2 is substantially planar to enable easy passage thereover of the traffic when the same are employed as duckboards; and the mid-portion of the bottom of each of the buoyant members is substantially parallel with the said upper surface. However, the ends of the bottom surfaces of the buoyant members 2 are bevelled, or "raked," as shown at 3, for obtaining advantages which will be described more fully hereinafter.

Each end of each of the buoyant members 2 carries a transverse casting 4 which extends over substantially the full width thereof to terminate flush with the sides. Each of these castings is provided at each of its ends with a pair of parallel forwardly projecting ears, one pair of the said ears forming a female attaching member; and the other pair of ears carrying a male attaching member. These castings 4 are identical in construction whereby the arrangement of male and female attaching members is reversed on the opposite ends of each of the buoyant members 2. This construction and arrangement enables the turning of the duckboards from end-to-end without loss of interchangeability. The pair of ears forming the female attaching member are indicated at 5, and between them there extends a pin 6 for engagement with the male attaching member which will be described more fully hereinafter.

Referring more particularly to Figures 3 and 6, the pair of ears forming the male attaching member is indicated at 8; and the two ears of this pair are jointly recessed, as at 9, to accommodate the previously described pin 6. Between the pair of ears 8 of the male attaching member there is disposed a substantially triangular latch which is pivotally mounted at its apex, and, has a recess in its base portion which is capable of alignment with the joint recesses 9. The recess 12 of the latch 11 is substantially wider than the corresponding joint recesses 9 of the ears 8; and on the lower edge of the said recess 12 there is formed an upwardly projecting lug 13 which is adapted to seat behind the pin 6 of the interlocking female attaching member. The outer face of the lug 13 is sloped, thereby permitting the latch 11 to be forced down as the pin 6 is pushed against it when making a connection. A spring 15 resiliently maintains the latch 11 in its uppermost position after the pin 6 is in place in the joint recesses of the pair of ears 8 and the recess 12 of the latch. Depression of the latch 11 will permit the lug 13 to clear the pin 6; and in order that this may be easily done, the upper edge of the latch is designed to project beyond one of the corresponding edges of the ears 8. By means of the spring 15, the latch 11 is normally disposed so as to prevent the disengagement of interlocked male and female attaching members of end-abutted buoyant members.

When in the interlocked relationship aforesaid, a series of buoyant members 2 forms a sturdy footbridge, as shown in Figure 9, and provides increased stability in high currents.

Figure 7:
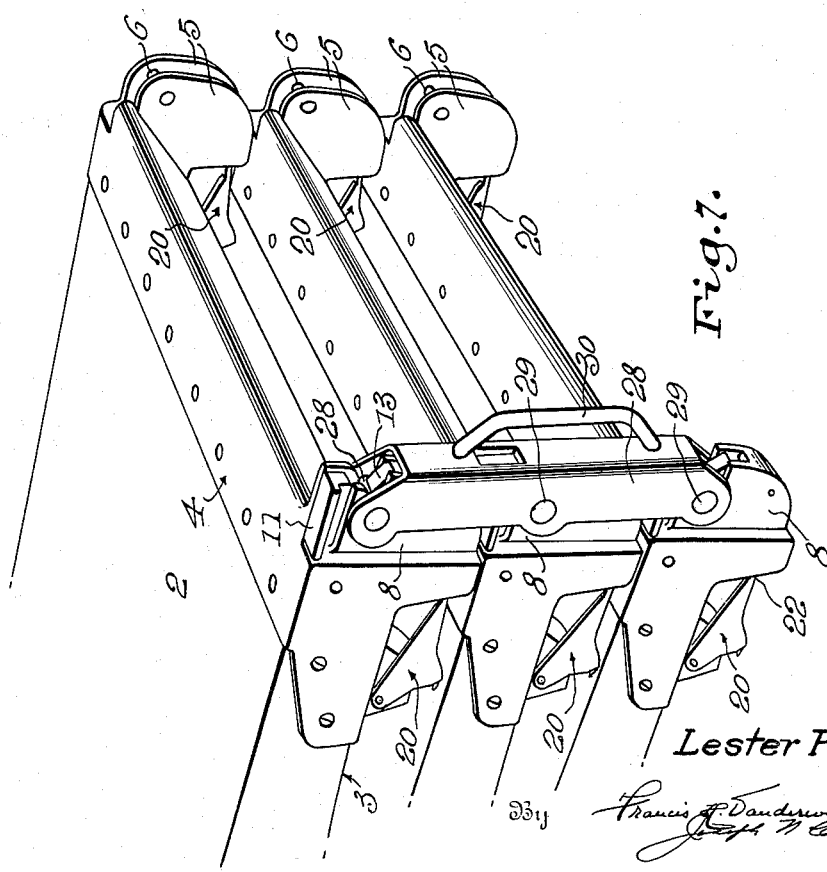
Figure 7 is a fragmentary perspective of three buoyant elements in superposed or stacked relationship, and secured together in order to facilitate transportation or storage, or to permit the stack to serve as a unitary float of substantially increased capacity.

In order to accommodate increased loads, the teachings of the invention contemplate increasing the buoyancy of an interlocked series of the buoyant members 2 by employing as floats additional and identical buoyant members placed thereunder and disposed to extend at substantial right-angles with respect thereto. This may be accomplished in a number of different ways, ranging from the utilization of one buoyant member for each float desired (as shown in Figure 10) to a stacked series of several in superposed relationship, as shown in Figure 7; and the number of floats for each unit of buoyant members may be likewise varied in number and/or location. In any event, provision is made on the bottom of each buoyant member 2 for attaching thereto another and identical buoyant member, and in right-angular relationship with respect thereto. For such purposes, there is mounted on the bottom of each of the castings 4 a pivotal clamping member 20, the same being disposed to extend longitudinally inward of the buoyant members 2 from points which align with the spaces between the ears 5 and 8 of the female and male attaching members, respectively. Each of these pivotal clamping members 20 is provided with an inwardly projecting lug 21; and comprises an integral handle portion 22 which extends between the ears (5 or 8) of the adjacent attaching member. In the case of the pivotal clamping members 20 which are disposed between the pairs of ears 8 of the male attaching members, the integral handle portions 22 thereof are spring-biased outwardly of the said ears by means of a portion of the adjacent curvilinear spring 15; while the pivotal clamping members 20 which are disposed between the pairs of ears 5 of the female attaching members are similarly spring-biased by a similar spring 23. In both instances, the excessive outward movement of the pivotal clamping members 20 is prevented by a stop 24.

Spaced from each of the pivotal clamping members 20, and in opposing relationship with respect thereto, is a stationary lug 25 which conforms in cross-section to the inwardly projecting lug 21; the spacing between the said pivotal clamping members 20 and the opposing stationary lugs 25 corresponding to the width of one of the buoyant members 2.

At suitable intervals, each side of each of the buoyant members 2 is provided with a plate 26 having a series of three triangularly spaced recesses 27, each recess conforming in cross-section to the pivotal clamping members 20 and the correspondingly shaped opposing stationary lugs 25.

If floats are to be composed of superposed buoyant members 2, the ends thereof may be connected together to form a unitary structure. A suitable connector is shown in Figures 7 and 8; as comprising a channel-shaped clip 28. As before stated, the castings 4 of each member 2 are identically formed and its female and male attaching members correspondingly occupy diametrically opposite points. Thus, when in stacked relation, all of the male attaching members at one end are in vertical alignment and the male attaching members on the opposite end are disposed diametrically opposite, and are also vertically aligned. Accordingly then, considerable rigidity may be obtained by clamping together only the male attaching members of diametrically opposite ends of a stacked series of buoyant members 2. To take advantage of this situation there is provided at suitably spaced points on the channel-shaped clip 28 a series of transverse pins 29, one of which seats behind the upwardly projecting lug 13 of the latch 11 of each of the adjacent male attaching members. A loop-like longitudinally extending handle 30 is provided for promoting efficient handling. This arrangement is also very effective for transporting and storing the stacked buoyant members.

Referring to Figures 13 and 14, there may be provided for cooperation with the plates 26 of the buoyant members 2, clips 32 having hooks 33 which fit into, and lock with, the recesses 27. To each of these clips 32 there may be attached a vertical standard 34, and the said vertical standards may, in turn, support a handrail (not shown) of rope, or the like.

Having thus described my invention, what I claim as new and wish to secure by Letters Patent is:

1. A ponton element for use in constructing a portable floating bridge structure comprising an elongated shallow buoyant element, attaching members at both ends thereof and arranged for end-to-end connection with similar complemental attaching members on successive buoyant elements for constructing the bridge, the said attaching members including a casting extending across each end of the buoyant element and defining male and female securing means on each end, the said securing means being reversed on the respective ends, the male securing means including spaced parallel ears, a cam-acting latch pivotally mounted between the ears, and resilient means normally holding the latch member in latching position, the said female securing means including spaced ears adapted to receive the ears of a complementary male securing means on another buoyant element, and a locking pin spanning the spaced ears for engaging the cam-acting latch of the male securing means and pressing the latch towards open position for interlocking therewith responsively to coupling successive buoyant elements in end-to-end position.

2. A ponton element for use in constructing a portable floating bridge structure, comprising an elongated shallow buoyant element, attaching members at both ends thereof and arranged for end-to-end connection with complemental attaching means on successive adjacent elements for constructing the bridge, the said attaching means including a casting extending across each end of the buoyant element and defining male and female securing means on each end, the said securing means being reversed on the respective ends, the male securing means including spaced ears, an inwardly-extending locking recess located on the upper portion of the said ears, a cam-acting latch pivotally mounted on the ears and registering with the said recess, and a leaf spring engaging the latch and normally holding the latch in upper closing position, the said female securing means including spaced ears adapted to receive the ears of a complementary male securing means on another buoyant element, and a locking pin interconnecting the ears of the female securing means adapted to enter the locking recess on the complementary male securing means and to depress the cam-acting latch thereof against the pressure of the leaf springs for depressing the latch responsively to end-to-end coupling of the buoyant elements, the said spring lifting the latch into latching position behind the locking pin for releasably latching the successive buoyant elements in end-to-end position.

3. A ponton element for use in constructing a portable floating bridge structure, comprising an elongated shallow buoyant element, attaching means at both ends thereof and arranged for connection with similar attaching members on successive buoyant elements for constructing the bridge, the said attaching means including a casting extending across each end of the buoyant element and defining projecting male and female securing means on each end, the said securing means being reversed in position on the respective ends of each buoyant element, the male securing means including spaced parallel ears provided with an inwardly extending locking recess extending substantially horizontally into the ears from the periphery thereof, a cam-acting latch pivotally mounted on the ears and extending into the said recess, and a leaf spring mounted between the ears having an arm engaging the latch and urging the latch upwardly into latching position, the said female securing means including spaced ears adapted to receive the ears of a complementary male securing means on another buoyant element, and a locking pin extending between the ears of the female securing means adapted to enter the locking recess and interlock with the latch therein responsively to end-to-end coupling of the buoyant elements, the said spring lifting the latch into latching position behind the locking pin for releasably latching the successive buoyant elements in end-to-end position, a second latch mounted between the ears of the male securing means and extending rearwardly of the buoyant element beneath the bottom thereof, and a second arm of the leaf spring urging the second latch into latching position, the said second latch being adapted to be received in and to interlock with complemental recesses on the side of another of the buoyant elements for securing at least a pair of the buoyant elements together in superposed relation at approximately right angles to each other for increasing buoyancy of the said elements.

4. A portable floating bridge comprising a plurality of interconnected substantially rectangular and shallow interchangeable and identical buoyant elements assembled in end-to-end relationship, each of the elements having attaching members at both ends thereof, the said attaching members including means extending transversely of each end of the said buoyant elements, each of said means having male and female members interconnected with similar complementary attaching members on the ends of adjoining buoyant elements, the male and female attaching members being reversed on opposite ends of each buoyant element for effecting the end-to-end assembly and interconnection of the buoyant elements for forming the bridge, spaced recessed plates on the sides of the buoyant elements, and depending spaced lugs mounted on each of said elements and projecting below its under-surface, one of said lugs being resiliently mounted, the end-to-end elements being mounted transversely of one or more spaced elements, the lugs on one of the end-to-end elements interfitting in the recessed plates of a transverse element connectably superposing the end-to-end buoyant elements on the transverse element.

5. A portable floating bridge comprising a plurality of interconnected substantially rectangular, interchangeable and identical buoyant elements assembled in end-to-end relationship, each of the elements having attaching members at both ends thereof, the said attaching members including means extending transversely across each end of the said buoyant elements, each of said means being provided with male and female attaching members interconnected with similar complementary attaching members on the ends of adjoining buoyant elements, the male and female attaching members being reversed on opposite ends of each buoyant element for effecting the end-to-end interconnection between the buoyant elements for forming the bridge, said end-to-end elements being supported on one or more transverse buoyant elements, spaced recessed lateral plates along the sides of the transverse buoyant elements, and connecting members projecting below the underside of the end-to-end elements, the connecting members on one of the end-to-end elements engaging the recesses of the lateral plates of a transverse element and interlocking therewith in superposed relationship.

6. A bridge comprising a plurality of identical ponton members, each of said members having spaced male and female securing means at each end, the said securing means being reversed on the respective ends, spaced opposed attaching means mounted on the bottom portion of the members, complementary attaching means supported along the sides of the members for engagement with said spaced attaching means, a plurality of the members being arranged in superposed relationship with the male members and the female members being in vertical alignment, means engaging the male and female members for securing the stacked members in superposed relationship, a plurality of said members being connected together in end-to-end relationship and arranged above and transversely of the superposed members, the spaced opposed attaching means of an end-to-end member being engaged with the complementary attaching means of the top member of the superposed members to form the bridge.

7. A ponton member adapted to associate with other similar members in end-to-end or crosswise superposed relationship, said member having spaced male and female securing means at each end, the said securing means being reversed on the respective ends, spaced opposed attaching means mounted on the bottom portion of the members and projecting therebelow, one of said attaching means being resiliently mounted, and complementary attaching means supported along the sides of the members for engagement with said spaced attaching means when a member is mounted on another in crosswise relationship.

References Cited in the file of this patent

UNITED STATES PATENTS

| | | |
|---|---|---|
| 41,288 | Francis | Jan. 19, 1864 |
| 1,073,794 | Christensen | Sept. 23, 1913 |
| 1,875,061 | Lovejoy | Aug. 30, 1932 |
| 2,364,072 | Houghtaling | Dec. 5, 1944 |
| 2,367,291 | LeTourneau | Jan. 16, 1945 |

FOREIGN PATENTS

| | | |
|---|---|---|
| 753,866 | France | Oct. 26, 1933 |

OTHER REFERENCES

Engineering News Record, pp. 131 and 133, February 8, 1945.

TM 5-271 War Department Technical Manual of March 27, 1944.